Nov. 30, 1954  M. B. LUCKER  2,695,768
CRADLE JACK
Filed Sept. 11, 1948  3 Sheets-Sheet 3
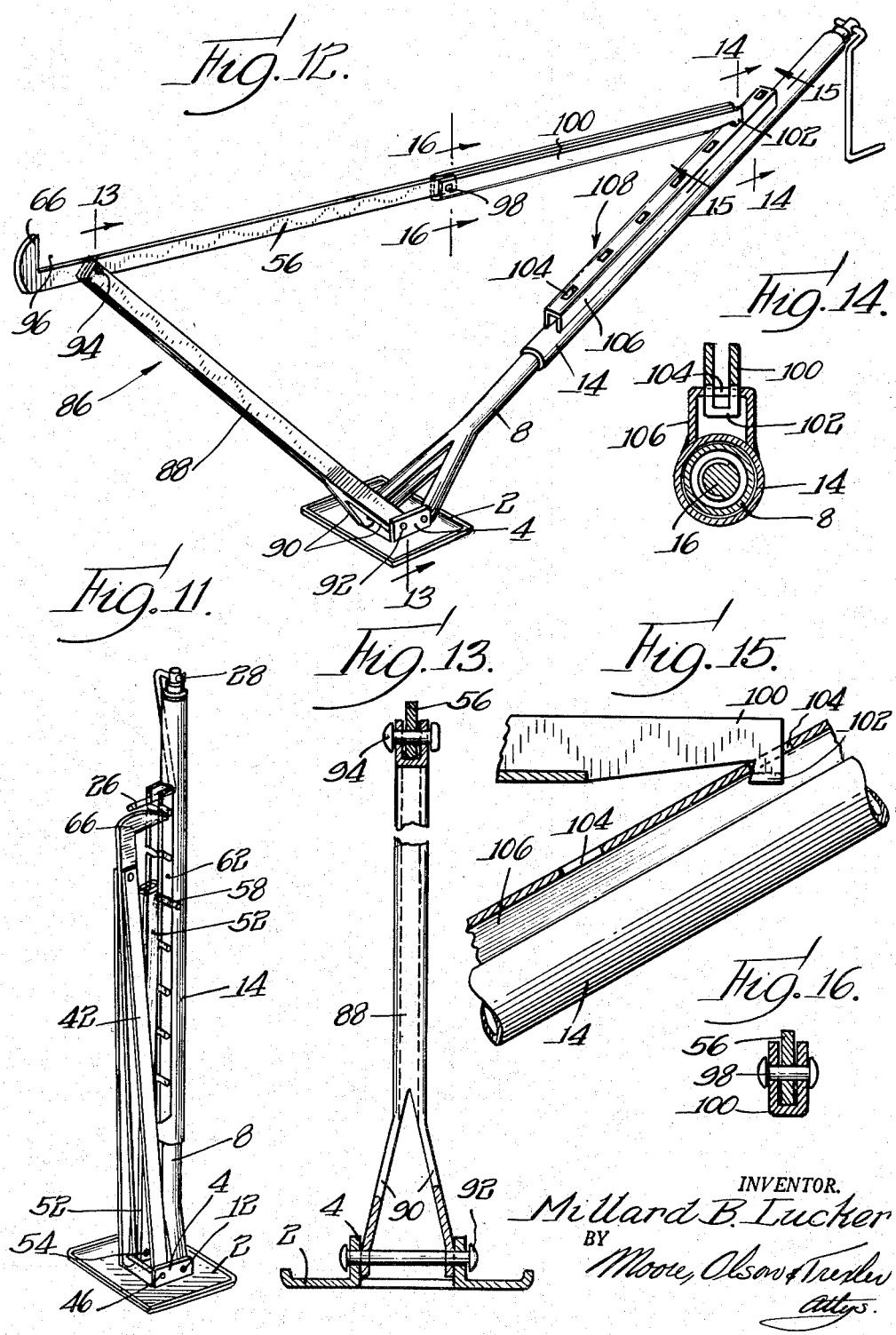
INVENTOR.
Millard B. Lucker
BY
Moore, Olson & Trexler
Attys.

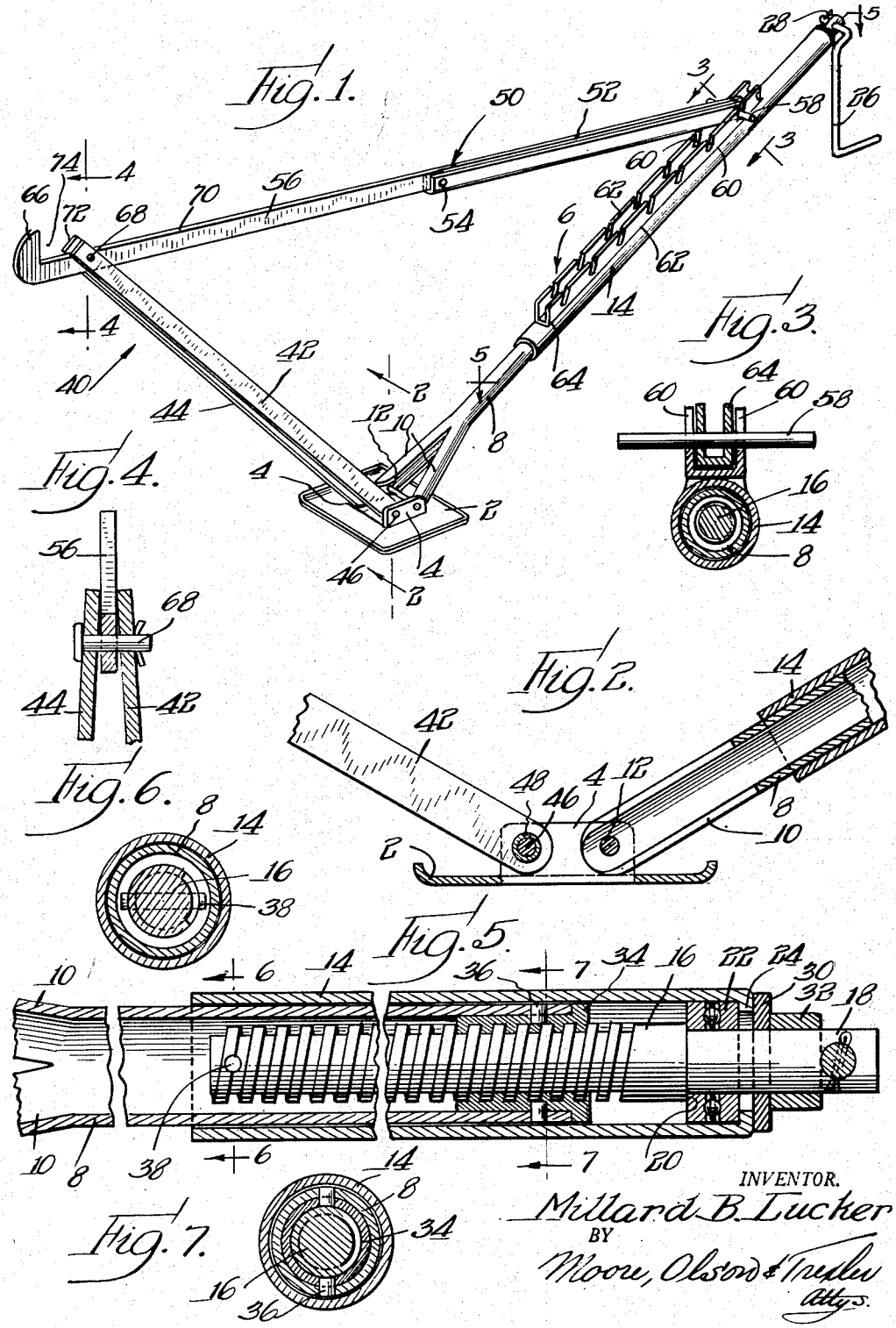

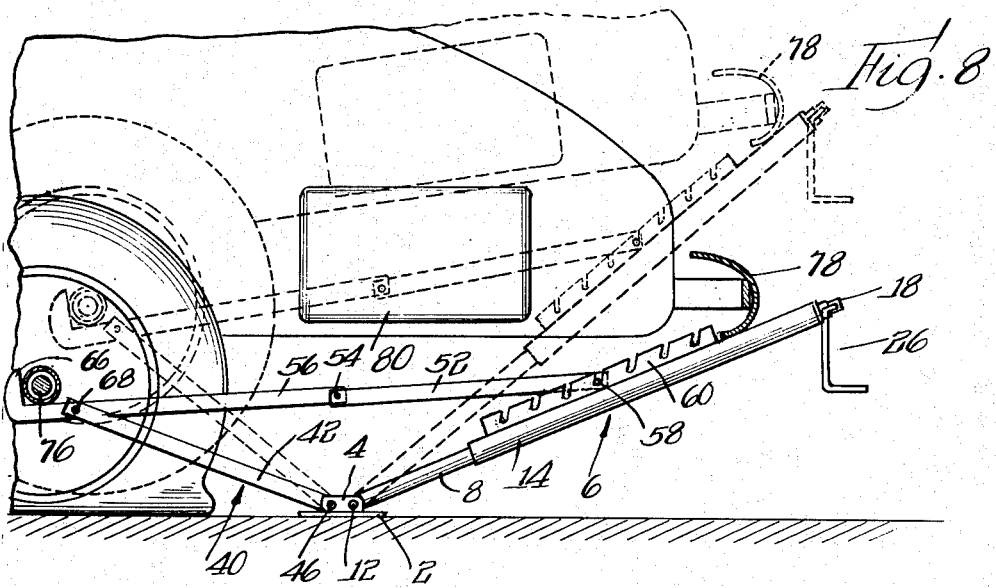
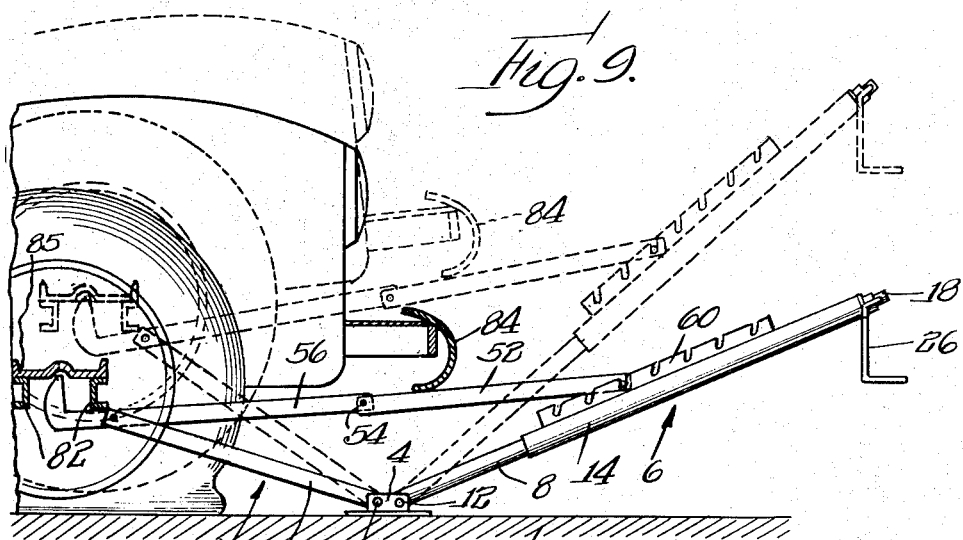
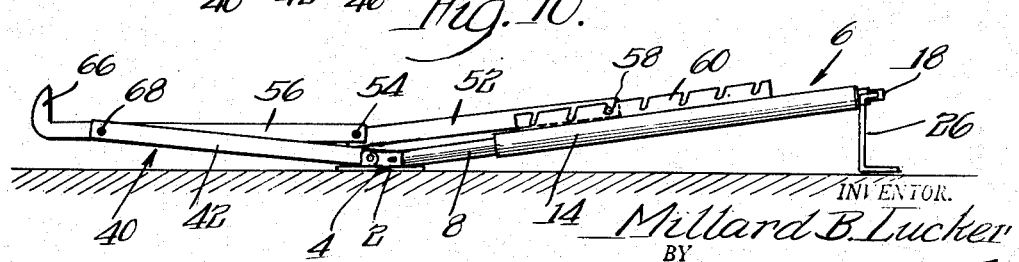

United States Patent Office 2,695,768
Patented Nov. 30, 1954

2,695,768

CRADLE JACK

Millard B. Lucker, St. Joseph, Mich., assignor to Auto Specialties Manufacturing Company, St. Joseph, Mich., a corporation of Michigan Application September 11, 1948, Serial No. 48,805

5 Claims. (Cl. 254—133)

This invention relates to a jack.

It is an object of the invention to provide a vehicle jack capable of simultaneously lifting the body or frame and the wheel or wheel structure.

The modern streamlined automobile is difficult to raise, for the purpose of changing a tire, by known type jacks because the considerable extension of the body beyond the front and rear wheels makes it extremely difficult to locate a part fixed to the wheel in order to engage it by any known wheel or axle jack; the skirted fenders in many cars so overhang the wheels or tires that it is impossible to change a tire without raising the body with respect to the wheel; and the extreme flexibility or extensibility of the springs makes it necessary to raise the car body to such a height by known bumper jacks that the use of such bumper jacks is sometimes hazardous, particularly on a hillside, a crowned road, or on unlevel ground.

Accordingly, it is a further object of the invention to provide a simple and inexpensive jack structure readily engageable with the axle or other part attached or affixed to the wheel, and also readily engageable with the bumper or other part rigidly attached to the body or frame of the automobile to simultaneously raise the wheel with the body but to a lesser extent so that greater clearance may be provided for removing the wheel.

Another further important object of the invention is to provide a readily collapsible vehicle jack having means forming a cradle of adjustable length which may be brought into engagement with an axle or like part rigidly attached to the wheel and a bumper or like part rigidly attached to the body and means to cause the cradle to be raised to lift the wheel and the body of the car while allowing shifting of the vehicle on the cradle without danger of upsetting the jack or bending or breaking of a fender, bumper, gas tank or other part of the vehicle.

Other objects of the invention are to provide a simple and inexpensive, readily collapsible jack structure of universal application for all types of automobiles; to provide a jack structure having a plurality of interconnecting lifting members readily adjustable to engage the wheel axle, or like part, and a bumper or like part of the various models and makes of automobiles wherein the distance between the said axle and bumper varies considerably; to provide such a jack structure wherein the interconnecting means is readily adjustable with respect to the lifting members, or one of them, to clear structures, such as a gas tank, intervening between the wheel attached part and the body attached part; to provide such a jack structure wherein the lifting members and the interconnecting means are readily collapsible to provide when collapsed a compact jack structure easily stored within the luggage compartment of the automobile, and readily extendible for use thereof; to provide a jack structure having members which in effect form a cradle engageable with spaced parts rigidly attached to the body and wheel of the automobile and lifting members moving in unison and relatively to each other to raise the wheel and the body and providing a stable support for the automobile in raised position.

Other and further objects and advantages of the invention will be apparent from the following description when taken in connection with the accompanying drawings wherein:

Fig. 1 is a view in perspective of the jack embodying the invention;

Fig. 2 is a fragmentary view in section taken substantially along the line 2—2 of Fig. 1;

Fig. 3 is a view in section taken along the line 3—3 of Fig. 1;

Fig. 4 is a fragmentary view in section taken along the line 4—4 of Fig. 1;

Fig. 5 is a fragmentary enlarged view in section taken along the line 5—5 of Fig. 1;

Fig. 6 is a view in section taken along the line 6—6 of Fig. 5;

Fig. 7 is a view in section taken along the line 7—7 of Fig. 5;

Figs. 8 and 9 are diagrammatic views illustrating the manner of use and operation of the jack of Figs. 1 to 5;

Fig. 10 is a view in elevation illustrating the jack of Figs. 1 to 5 in lowermost position;

Fig. 11 is a view in perspective illustrating the jack of Figs. 1 to 5 in fully collapsed position for storage;

Fig. 12 is a view in perspective similar to Fig. 1 showing a modified jack construction;

Fig. 13 is a view of a section taken along the line 13—13 of Fig. 12;

Fig. 14 is a view in section taken along the line 14—14 of Fig. 12;

Fig. 15 is a view in section taken along the line 15—15 of Fig. 12; and

Fig. 16 is a view in section taken along the line 16—16 of Fig. 12.

As shown in Fig. 1, a jack embodying the present invention comprises a base or support 2 in the form of a plate having spaced flanges 4 stamped and upstanding from the base. A bumper engaging and jacking unit 6 comprises a tube 8 having a bifurcated lower end portion 10 pivoted on a cross pin 12 secured in the upstanding flanges 4 of the base and held against removal therefrom as by peening over the opposite ends of the pin. Tube 14 is slidably mounted on and telescoped with the tube 8 and both tubes house a screw shaft or actuating member 16 which is secured to the outer tube 14 and telescopes into the lower, inner tube 8. The screw shaft 16 has a reduced upper end portion 18 which forms a shoulder 20, the portion 18 projecting through the open upper end of the tube 14 and the shoulder 20 seating against a ball bearing 22 housed within the tube 14 located between the shoulder 20 and the inturned annular flange 24 at the upper end of the tube 14.

An operating crank 26 passes through a suitable opening in the upper end portion 18 of the screw shaft and is held in position as by a cotter pin 28. A washer 30 closes the open upper end of the tube 14 and spacing collar 32 is interposed between the washer and the operating crank 26 to hold the washer in place.

An internally threaded sleeve or nut 34 engages with the thread of the screw shaft and is fixed as by pins 36 or by other suitable means to the tube 8 so that on rotation of the screw shaft the threaded sleeve or nut will cause the screw shaft to be moved axially, thereby extending or retracting the tube 14 relative to the tube 8. A cross pin 38 at the lower or inner end of the screw shaft projects beyond the screw thread to engage the threaded sleeve or nut 34 and thereby limit the outward or lifting movement of the screw shaft 16.

It will be evident that the screw shaft 16 and nut 34 form an actuating mechanism causing extension and retraction of the member or tube 14 relative to the lower tube or member 8 and that the tubes 8 and 14 constitute an extensible and retractable lifting member which may be actuated by other particular actuating mechanisms such as by ratchet actuators, hydraulic actuators, rod and cam or friction jack actuators, and other known actuating mechanisms for causing extension and retraction of two relatively slidable jack members.

A lifting unit, strut or member 40 may comprise a pair of bars 42 and 44 pivoted at their lower ends on a cross pin 46 secured to the upstanding flanges 4 of the base support 2, the pin being suitably fixed to the base as by peening over the opposite ends of the pin. A spacing sleeve 48 is interposed between the lower ends of the two bars 42 and 44.

The two jack units 6 and 40 are releasably and adjustably joined by an interconnecting unit or means 50 which comprises a channel bar 52 pivoted at its rear or inner end as by pin 54 to the front or outer end of the bar 56. The channel bar 52 is provided at its forward or outer end with a cross pin 58 adapted for selective insertion in pairs of outwardly opening slots 60 formed in the upstanding side flanges 62 of a channel bar 64 welded or otherwise suitably secured to the lifting member or tube 14 and extending longitudinally thereof. The rear or inner end of the bar 56 is provided with a laterally and upwardly directed portion or hook 66 and the bar is pivoted inwardly of the portion or hook 66 to the lifting strut formed by bars 42 and 44 of the rear lifting unit 40. It is to be noted that the pin 68, by which the bar 56 is pivoted to the strut, is located inwardly from the outer end of the strut bars 42 and 44 so that these bars project above the upper edge 70 of the interconnecting bar 56 and form between the upper ends 72 of the strut bars and the portion or hook 66 an axle or wheel part receiving saddle 74.

It should be noted that the jacking unit 6 forms a bumper or body engaging jack or jack section, while the strut 40 and the hooked end of the bar 56, form a wheel jack or jack section and that the bar 52, the portion of the bar 56 between pivots 54 and 68 and the outer bar or channel 64 form an adjustable interconnecting means between these jacks or jack sections, causing one jack or jack section to be operated by the other.

The use of the jack for changing a rear tire is illustrated in Fig. 8. The first time the jack is used the proper pair of slots 60 into which cross pin 58 should be inserted is determined and noted. The proper adjustment is of course governed by the relative heights of the wheel part and the body part engaged by the jack and the distance longitudinally of the vehicle between those parts. This of course varies with the different makes and models of automobiles. That slot should be selected which causes the tube 14 to most nearly approach the bumper when the tube 14 is fully retracted and the hook 66 in engagement with the axle. The proper pair of slots having been once determined, in subsequent use of the jack it is merely necessary to insert the cross pin 58 in the proper pair of slots 60, then by raising and swinging the tubes 14 and 8 about the base mounting pin 12, the hook 66 is lowered sufficiently to be moved under the axle 76, Fig. 8. The bar 14 is then depressed to swing it and the bar 8 about the base mounting pin 12, thereby causing the hook 66 to swing up in front of the axle and the jack pulled forward sufficiently so that the hook 66 engages the axle and the axle is seated in the saddle 74 formed by the vertical face of the hook 66 and the projecting ends 72 of the strut bars 42 and 44. The tube 14 will then extend outwardly and rearwardly of the vehicle beyond and below the bumper 78. The crank 26 is then rotated to extend the tube 14 by causing it to slide outwardly along the lower tube 8 until the bumper is engaged by the upper portion of the tube 14 outwardly of the bar 64, as shown in full lines in Fig. 8. Thereafter, as the crank 26 is rotated, the tube 14 continues to slide outwardly along the tube 8 with the parts of the jack moving from the full line position shown in Fig. 8 to the position shown in dash lines in the same figure.

As the tube 14 moves outwardly along the rod 8 it causes the rear struts to swing upwardly in a clockwise direction, as seen in Fig. 8, about its base pivot pin 46, thereby lifting the wheel and at the same time the tube 14 is caused by the interconnection to the rear strut to swing in a counter-clockwise direction, as seen in Fig. 8, thereby raising the body of the automobile simultaneously with the raising of the wheel. The simultaneous extension of the tube 14 and the swinging of the tubes 8 and 14 about the base pin 12 cause the body to move upwardly at a faster rate and hence to a greater extent than the wheel, as shown in Fig. 8.

It should be noted that the bar or channel 64 is terminated or located sufficiently below the top of the tube 14 that the interconnecting means, more particularly the member 52, will clear the lowest hanging part between the rear axle and the rear bumper. This is usually the gas tank 80, and it will be evident from Fig. 8 that it will be impossible to locate the cross pin 68 in such position along the bar 64 that the bar 56 would engage the gas tank.

The jack may be used to change a front tire, as shown in Fig. 9. The distance between the front wheel mounting arms 82 and the front bumper 84 is generally considerably less than the distance between the rear axle 76 and the bumper 78 of the same automobile. In the case of the front wheels the proper adjustment of the cross pin 58 along the bar or channel 64 is determined by the relative heights of the wheel mounting arms and the bumper and the distance between them. That slot should be selected which causes the tube 14, or the bar 52, to most nearly approach the bumper when the tube 14 is fully retracted. The proper slot having once been determined, on subsequent use of the jack it is merely necessary to insert the pin in the thus determined slot and the tube 14 is then lifted and swung, with its mounting tube 8 about the base of the mounting pin 12 so that the hook 66 may be readily introduced under the front wheel mounting arm 82 and swung upwardly between that arm and the rear mounting arm for the same wheel, so that the hook 66 projects up into the conical, spring locating plate 85 carried by the wheel mounting arms. The front wheel mounting arm 82 then rests on the bar 56, or within the saddle 74 between the hook 66 and the end 72 of the strut bars 42 and 44. The tube 14 is then extended along the tube 8 by rotation of the crank 26 until the tube 14, or the bar 52 engages the front bumper 84, as shown in full lines in Fig. 9. Continued rotation of the crank causes the continued extension of the tube 14 and raising of the interconnecting bars 52 and 56 as the rear struts 42 and 44 swing in a clockwise direction, as seen in Fig. 9, and the tubes 8 and 14 swing in a counter-clockwise direction, as seen in said figure.

The tube 14 as it is extended exerts a pull upon the bars 52 and 56 and prevents these bars from buckling downwardly under the weight of the body and therefore the bar 52 raises the body while the bar 56 raises the wheel.

As shown in Fig. 10, the jack may be caused, by retraction of the tube 14 and adjustment of the cross pin 58 along the bar or channel 64, to assume a lowermost position in which the rear strut bars 42 and 44 and the bar 56 are substantially horizontal and the tubes 8 and 14 are inclined only sufficiently to permit the crank 26 to be rotated.

It will be evident that the jack heretofore described provides not only a wheel jack and a body jack simultaneously operable, but also a lifting cradle engageable with the axle or other part rigid with the wheel and with the bumper or other part rigid with the body, the cradle being tiltable or rockable on its base support in such direction as to raise the body higher than the wheel as the cradle is lifted, all as shown in Figs. 8 and 9.

It will also be evident that, as shown in Figs. 8 and 9, there may be relative movement between the automobile and jack lengthwise of the tube 14, or the bar 52, so that there is no tendency for the jack to bend or break the bumper or the wheel carried part with which the jack may be engaged.

As shown in Fig. 11, the jack is readily collapsible for storage by first releasing the cross pin 58 from the engaged slots in the bar 64 and then folding or pivoting the bars 52 and 56 toward each other and against the strut bars 42 and 44, after which the tube 14 and the strut bars may be swung toward each other and the crank 26 swung downwardly to extend alongside the tube 14. In such collapsed position the jack may be stored in a relatively small space within the automobile.

In the modification shown in Figs. 12 to 15, the rear liftable member 86 comprises a channel bar 88, the lower end of which is split or spread to form spaced apart arms 90 swingably mounted on pivot pin 92 carried by the upstanding flanges 4 of the base 2. At its upper end, the channel bar 88 receives between its opposite flanges the bar 56 secured as by pivot pin 94, the opposite side flanges of the channel bar extending upwardly beyond the upper edge of the bar 56 to form a receiving saddle 96 between the flanges of the channel bar and the hook end 66 of the bar 56. The bar 56 is pivoted at its inner end as by pin 98 to channel bar 100, similar to the bar 52 of the form shown in Figs. 1 to 11. The base flange of the channel bar 100 at the forward end of the bar is cut away or slotted, and portions of the opposite side flanges are cut away to form a forwardly downwardly projecting tooth 102 adapted for selective engagement in square or rectangular recesses 104 in a channel bar 106 having its side flanges depending and welded or otherwise secured to the tube 14 of the front lifting unit 108 which otherwise is of the same construction as the lifting unit 6 of the jack shown in Figs. 1 to 11.

The jack shown in Figs. 12 to 15 is used and operated in the same manner as that described with respect to the jack shown in Figs. 1 to 11. The modified jack structure provides a more rugged structure for the heavier automobiles and a more rugged releasable latch between the interconnecting channel bar 100 and the extendible and retractable tube 14.

It will be evident from the foregoing description that applicant has provided an automobile jack capable of simultaneously lifting the body or frame and the wheel or wheel structure to different extents, so that although the wheel and body are raised, the body is also raised relative to the wheel; a simple and inexpensive jack structure having a pair of liftable members and means interconnecting the liftable members, one of the liftable members being readily engageable with the axle or other part attached or affixed to the wheel, and the other liftable member being readily engageable with the bumper or other part rigidly attached to the body or frame of the automobile, and the interconnecting means causing the lifting of the bumper engaging member to simultaneously raise the wheel part engaging member so that the body part may be raised to a greater extent than the wheel; a readily collapsible jack having means forming a cradle which may be brought into engagement with a part rigidly attached to the wheel and a part rigidly attached to the body and may be raised to lift the wheel and the body of the car and tilted at a progressively increasing angle of inclination to raise the body at a faster rate than the wheel; a simple and inexpensive, readily collapsible jack structure of universal application for all types of automobiles; a jack structure having a plurality of interconnecting liftable members readily adjustable to engage a part rigidly attached to the wheel and a part rigidly attached to the body of the various models and makes of automobiles wherein the distance between the said parts varies considerably; a jack structure wherein the interconnecting means is readily adjustable with respect to the liftable members or one of them to clear structures such as the gas tank intervening between the wheel attached part and the body attached part; a jack structure wherein the liftable members and the interconnecting means are readily collapsible to provide when collapsed a compact jack structure easily stored and occupying a minimum space within the luggage compartment of the automobile, and readily extendible for use thereof; a jack structure having liftable members so constructed in moving relatively to each other to raise the wheel and the body relative to the wheel do not apply to the engaged parts forces tending to push or pull them apart.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a vehicle jack or the like, a base support, a pair of spaced bars mounted on said base, a supporting tube pivoted at its lower end on said base support, a load lifting tube telescopically mounted on said first tube for extension and retraction therefrom, a channel bar secured to said load lifting tube extending longitudinally thereof and having a plurality of longitudinally spaced slots therein, a cross bar passing between the pivoted bars at the upper end thereof and pivotally connected thereto and having a load lifting hook at its outer end, a second cross bar pivoted at one end to the other end of the first cross bar and having a projecting portion for selective engagement in the slots of the channel bar to vary the angle between the bars pivoted to the base and the load lifting tube, and means for extending and retracting the load lifting tube from the tube on which it is telescopically mounted.

2. In a vehicle jack or the like, a base support, a channel bar pivoted at its lower end on said base support, a tube pivoted at its lower end on said base support, a load lifting tube telescopically mounted on said supporting tube, a first cross bar passing between the flanges of the channel bar on the upper end thereof and pivotally connected thereto and extending therebeyond, said bar having a hook on the outer end of said cross bar, a second cross bar pivotally connected at one end to the inner end of the first cross bar, a channel bar secured to said load lifting tube and having longitudinally spaced notches therein, said second cross bar having a hook for selective engagement in said notches to vary the angle between the first mentioned channel bar and the load lifting tube, and means for extending and retracting said load lifting tube with respect to its supporting tube.

3. In a vehicle jack or the like, a base support, a pair of spaced bars mounted on said base, a supporting tube pivoted at its lower end on said base support, a load lifting tube telescopically mounted on said first tube for extension and retraction therefrom, a channel bar secured to said load lifting tube extending longitudinally thereof and having a plurality of longitudinally spaced slots therein, a cross bar passing between the pivoted bars at the upper end thereof and pivotally connected thereto and having a load lifting hook at its outer end, a second cross bar pivoted at one end to the other end of the first cross bar and having a projecting portion for selective engagement in the slots of the channel bar to vary the angle between the bars pivoted to the base and the load lifting tube, an internally threaded nut secured to said first tube, and an externally threaded screw shaft threaded into said nut and secured to said load lifting tube to extend and retract the load lifting tube from said first tube on rotation of said screw shaft.

4. In a vehicle jack, a base, a first member mounted on said base, a second member pivotally mounted upon said base, a load lifting member slidably mounted on said second member for extension and retraction therefrom, a channel bar secured to said load lifting member extending longitudinally thereof and having a plurality of longitudinally spaced slots therein, means interconnecting said channel bar and said first member and adapted to engage the portion of the bar surrounding said slots, and means for extending and retracting said load lifting member with respect to said second member.

5. In a vehicle jack, a base, a first member pivotally mounted on said base, a second member pivotally mounted on said base, a load lifting member slidably mounted on said second member, a channel bar secured to said load lifting member extending longitudinally thereof and having a plurality of longitudinally spaced slots therein, means interconnecting said first member and said load lifting member and adapted to engage the portion of the channel bar defining said slots, means formed on said interconnecting means adjacent the point of attachment with said first member adapted to engage a part of an automobile attached to a wheel, and means for extending and retracting the load lifting member with respect to said second member.

References Cited in the file of this patent
UNITED STATES PATENTS

| Number | Name | Date |
|---|---|---|
| 1,611,366 | Peterson et al. | Dec. 21, 1926 |
| 2,233,536 | Kelley | Mar. 4, 1941 |
| 2,359,060 | Strom | Sept. 26, 1944 |
| 2,373,848 | Owens | Apr. 17, 1945 |
| 2,604,299 | White | July 22, 1952 |